(12) United States Patent
Greenberg et al.

(10) Patent No.: US 6,387,487 B1
(45) Date of Patent: May 14, 2002

(54) DUAL CURE, LOW-SOLVENT SILICONE PRESSURE SENSITIVE ADHESIVES

(75) Inventors: Ronald A. Greenberg, Clifton Park; Roy M. Griswold, Ballston Spa, both of NY (US); Shaow B. Lin, Midland, MI (US); David F. Townsend, Voorheesville, NY (US); Ference Horkay, Rockville, MD (US)

(73) Assignee: General Electric Company, Schenectady, NY (US)

( * ) Notice: Subject to any disclaimer, the term of this patent is extended or adjusted under 35 U.S.C. 154(b) by 62 days.

(21) Appl. No.: 09/637,779

(22) Filed: Aug. 11, 2000

(51) Int. Cl.[7] .......................... C08G 77/08; B32B 9/04; B32B 7/12
(52) U.S. Cl. ..................... 428/355 R; 528/24; 528/31; 528/32; 528/15; 525/477; 525/479
(58) Field of Search .................. 528/15, 24, 31, 528/32; 525/477, 479; 428/447, 355 R

(56) References Cited

U.S. PATENT DOCUMENTS

| | | |
|---|---|---|
| 2,676,182 A | 4/1954 | Daudt et al. |
| 3,159,601 A | 12/1964 | Ashby |
| 3,159,662 A | 12/1964 | Ashby |
| 3,188,299 A | 6/1965 | Chalk |
| 3,188,300 A | 6/1965 | Chalk |
| 3,192,181 A | 6/1965 | Moore |
| 3,220,970 A | 11/1965 | Carlstrom et al. |
| 3,344,111 A | 9/1967 | Chalk |
| 3,383,356 A | 5/1968 | Nielson |
| 3,445,420 A | 5/1969 | Kookootsedes et al. |
| 3,453,233 A | 7/1969 | Flatt |
| 3,453,234 A | 7/1969 | Kookootsedes |
| 3,516,946 A | 6/1970 | Modic |
| 3,532,649 A | 10/1970 | Smith et al. |
| 3,814,730 A | 6/1974 | Karstedt |
| 4,016,328 A | 4/1977 | Horning |
| 4,510,094 A | 4/1985 | Drahnak |
| 4,587,137 A | * 5/1986 | Eckberg |
| 4,988,779 A | * 1/1991 | Medford et al. |
| 5,169,728 A | * 12/1992 | Boardman |
| 5,248,739 A | 9/1993 | Schmidt et al. |
| 5,254,644 A | * 10/1993 | Kobori et al. |
| 5,292,586 A | 3/1994 | Lin et al. |
| 5,366,809 A | * 11/1994 | Schmidt et al. |
| 5,399,614 A | * 3/1995 | Lin et al. |
| 5,466,532 A | 11/1995 | Wengrovius et al. |
| 5,545,700 A | * 8/1996 | Mealey et al. |
| 5,576,110 A | 11/1996 | Lin et al. |
| 5,696,209 A | * 12/1997 | King et al. |
| 5,863,625 A | * 1/1999 | Chiou |
| 5,916,981 A | 6/1999 | Cifuentes et al. |

* cited by examiner

Primary Examiner—Robert Dawson
Assistant Examiner—Marc S. Zimmer

(57) ABSTRACT

A pressure sensitive adhesive composition includes an alkenyl-terminated polydiorganosiloxane, a silanol-terminated polydiorganosiloxane, a resinous copolymer, an organohydrogenpolysiloxane with terminal Si—H groups, a hydrosilation catalyst, and an organic cross-linking agent. The composition provides excellent high temperature adhesion properties and enables coatable formulations with low solvent content.

35 Claims, No Drawings

DUAL CURE, LOW-SOLVENT SILICONE PRESSURE SENSITIVE ADHESIVES

BACKGROUND OF THE INVENTION

The present invention relates to silicone compositions suitable for forming pressure sensitive adhesives. More particularly, the present invention relates to solventless or low-solvent, curable silicone compositions suitable for forming pressure sensitive adhesive compositions having excellent tack and adhesive properties.

The term "pressure sensitive adhesive" (PSA) as used herein refers to adhesives that can be adhered to a surface and yet can be stripped from the surface without transferring more than trace quantities of adhesive to the surface, and can be readhered to the same or another surface because the adhesive retains some or all of its tack and adhesive strength. Silicone pressure sensitive adhesives have excellent adhesive and cohesive strength and high tack as well as excellent heat resistance, cold resistance, electrical properties, and the like, which makes them applicable for use as electrical-insulating tape and for various pressure-sensitive products that must be resistant to hot and cold.

However, a drawback associated with silicone pressure sensitive adhesives is the use, handling, and emission of flammable and volatile organic compounds, e.g., organic solvents, in the preparation of the pressure sensitive adhesives from compositions containing high levels of organic solvent. Solvent is generally used for the purpose of reducing the viscosity of the composition to a level that renders the curable composition processable. While low-solvent compositions are known, their high temperature performance, particularly their lap shear, is deficient for some applications.

Silicone compositions capable of curing to form pressure sensitive adhesive compositions are known in the art.

U.S. Pat. No. 5,248,739 to Schmidt et al. generally describes pressure sensitive adhesive compositions comprising a resinous copolymer and a polydiorganosiloxane.

Commonly assigned U.S. Pat. No. 5,292,586 to Lin et al. generally describes solventless or low-solvent silicone pressure sensitive adhesive compositions comprising a resinous copolymer, a vinyl-endblocked polydiorganosiloxane, and a hydride-endblocked polydiorganosiloxane.

Commonly assigned U.S. Pat. No. 5,466,532 to Wengrovius et al. describes solventless or low-solvent silicone pressure sensitive adhesive compositions comprising a resinous copolymer, a vinyl-terminated polydiorganosiloxane, a hydrogen-terminated polydiorganosiloxane, and a hydrosilation catalyst.

Commonly assigned U.S. Pat. No. 5,576,110 to Lin et al. describes pressure sensitive adhesive compositions comprising (A) a resinous copolymer; (B) an alkenyl-containing polydiorganosiloxane having a viscosity of at least about 3000 centipoise at 25° C.; (C) a set of multi-functional silicones as crosslinker; (D) optionally, a reaction mixture of (A) and (B); (E) a hydrosilation catalyst; and (F) optionally, an organic solvent.

U.S. Pat. No. 5,916,981 to Cifuentes et al. generally describes a method for preparing pressure sensitive adhesive compositions comprising a hydroxyl-terminated polydiorganosiloxane; at least one soluble MQ resin; at least one silanol condensation catalyst; at least one solvent or plasticizer; and an organic peroxide or azo compound.

There remains a need for solventless or low-solvent pressure sensitive adhesive silicone compositions with improved high temperature properties.

BRIEF SUMMARY OF THE INVENTION

Excellent processing properties and high temperature performance are provided by a curable, low-solvent silicone coating composition comprising:

(A) about 20 to about 80 parts by weight of an alkenyl-terminated polydiorganosiloxane of formula (I)

$$R^2R^1{}_2SiO(R^1{}_2SiO)_mSiR^1{}_2R^2 \qquad (I)$$

wherein each $R^1$ is independently an alkyl group having from 1 to about 10 carbon atoms or an aryl group, $R^2$ is an alkenyl group having from 1 to about 10 carbon atoms, and m has an average value of about 20 to about 2000;

(B) about 2 to about 80 parts by weight of a silanol-terminated polydiorganosiloxane of formula (II)

$$R^1{}_2Si(OH)O(R^1{}_2SiO)_pSiR^1{}_2(OH) \qquad (II)$$

wherein each $R^1$ is independently an alkyl group as defined above, and the average value of p is chosen to provide a viscosity of about 100,000 centipoise to about 750,000 centipoise;

(C) about 20 to about 80 parts by weight of a resinous copolymer containing $R_3SiO_{1/2}$ units and $SiO_{4/2}$ units, where R is a hydrocarbon monovalent radical having from 1 to about 6 carbon atoms, said resinous copolymer having a molar ratio of $R_3SiO_{1/2}$ units to $SiO_{4/2}$ units of about 0.6 to about 0.9;

(D) an organohydrogenpolysiloxane of formula (III)

$$R^3{}_2HSiO(R^3{}_2SiO)_qSiHR^3{}_2 \qquad (III)$$

wherein each $R^3$ is independently an alkyl group having 1 to about 10 carbon atoms or an aryl group; q has an average value of 1 to about 300; the molar ratio of silicon-bonded hydrogen groups in (D) to silicon-bonded alkenyl groups in (A) being about 0.8:1 to about 1.5:1;

(E) a catalytic amount of a hydrosilation catalyst; and (F) about 0.2 to about 6 parts by weight of a cross-linking agent comprising an organic peroxide or an organic azo compound;

wherein all parts by weight are based on the weight of the entire composition.

DETAILED DESCRIPTION OF THE INVENTION

A curable silicone coating composition with low solvent content and excellent processing properties comprises:

(A) about 20 to about 80 parts by weight of an alkenyl-terminated polydiorganosiloxane of formula (I)

$$R^2R^1{}_2SiO(R^1{}_2SiO)_mSiR^1{}_2R^2 \qquad (I)$$

wherein each $R^1$ is independently an alkyl group having from 1 to about 10 carbon atoms or an aryl group, $R^2$ is an alkenyl group having from 1 to about 10 carbon atoms, and m has an average value of about 20 to about 2000;

(B) about 2 to about 80 parts by weight of a silanol-terminated polydiorganosiloxane of formula (II)

$$R^1{}_2Si(OH)O(R^1{}_2SiO)_pSiR^1{}_2(OH) \qquad (II)$$

wherein each $R^1$ is independently an alkyl group as defined above, and the average value of p is chosen to provide a viscosity of about 100,000 centipoise to about 750,000 centipoise;

(C) about 20 to about 80 parts by weight of a resinous copolymer containing $R_3SiO_{1/2}$ units and $SiO_{4/2}$ units, where R is a hydrocarbon monovalent radical having from 1 to about 6 carbon atoms, said resinous copolymer having a molar ratio of $R_3SiO_{1/2}$ units to $SiO_{4/2}$ units of about 0.6 to about 0.9;

(D) an organohydrogenpolysiloxane of formula (III)

$$R^3{}_2HSiO(R^3{}_2SiO)_qSiHR^3{}_2 \quad (III)$$

wherein each $R^3$ is independently an alkyl group having 1 to about 10 carbon atoms or an aryl group; q has an average value of 1 to about 300; the molar ratio of silicon-bonded hydrogen groups in (D) to silicon-bonded alkenyl groups in (A) being about 0.8:1 to about 1.5:1;

(E) a catalytic amount of a hydrosilation catalyst; and (F) about 0.2 to about 6 parts by weight of a cross-linking agent comprising an organic peroxide or an organic azo compound;

wherein all parts by weight are based on the weight of the entire composition.

The use of alkenyl-terminated polydiorganosiloxane (A) and organohydrogenpolysiloxane (D) having two terminal hydride units per molecule increases the molecular weight of the cured composition, allowing the use of reduced solvent levels while maintaining a viscosity sufficiently low for coating.

Component (A) of the composition is an alkenyl-terminated polydiorganosiloxane having formula (I)

$$R^2R^1{}_2SiO(R^1{}_2SiO)_mSiR^1{}_2R^2 \quad (I)$$

wherein each $R^1$ is independently an alkyl group having 1 to about 10 carbon atoms or an aryl group, $R^2$ is an alkenyl group having 1 to about 10 carbon atoms, m has an average value of about 20 to about 2000, preferably about 90 to about 1200, more preferably about 120 to about 1000.

In formula (I), $R^1$ may be an alkyl group such as methyl, ethyl, or propyl, or an aryl group such as phenyl. Preferably, at least 99.5 percent and most preferably essentially 100 percent of all $R^1$ radicals are alkyl and most preferably methyl. $R^2$ may be an alkenyl group such as vinyl, allyl, or propenyl. Preferably, $R^2$ is vinyl. The polysiloxane (A) must be terminated with silicon-bonded alkenyl groups so that polymer chain extension with the terminal hydride groups on (D) will occur during cure.

Alkenyl-terminated polydiorganosiloxanes (A) can be present in an amount of about 20 to about 80 parts by weight, preferably about 20 to about 60 parts by weight; more preferably about 20 to about 40 parts by weight, based on the weight of the entire composition.

Alkenyl-terminated polydiorganosiloxanes (A) can be prepared by any of the conventional methods for preparing triorganosiloxane-terminated polydiorganosiloxanes. For example, a proper ratio of the appropriate hydrolyzable silanes, e.g., vinyldimethylchlorosilane and dimethyldichlorosilane, may be cohydrolyzed and condensed or alternately an appropriate 1,3-divinyltetraorganodisiloxane, e.g., symmetrical divinyldimethyldiphenyldisiloxane or divinyltetramethyldisiloxane, which furnishes the endgroups of the polydiorganosiloxane, may be equilibrated with an appropriate diorganopolysiloxane, e.g., octamethylcyclotetrasiloxane, in the presence of an acidic or basic catalyst. Regardless of the method of preparation of polydiorganosiloxane (A), there is usually coproduced a varying quantity of volatile, cyclic polydiorganosiloxanes. Volatile cyclic polydiorganosiloxanes, e.g., methyl tetramer, should be removed, since they are volatile and adversely affect pressure sensitive adhesive properties.

The amount of polydiorganosiloxane (A) specified above refers to the essentially cyclic free portion of the polydiorganosiloxane. This essentially cyclic free portion can be determined by heating a sample of the polydiorganosiloxane at 150° C. for up to 1 hour to yield a residue. This residue will be essentially free of cyclic material with the exception of trace quantities of macrocyclic polydiorganosiloxanes which are non-volatile at 150° C. and atmospheric pressure.

Many of these polydiorganosiloxanes (A) are commercially available. Furthermore, component (A) can be homopolymers or copolymers or their mixtures as long as they are alkenyl-endblocked polydiorganosiloxanes of formula (I). The viscosity of polydiorganosiloxanes (A) will, of course, depend on the their average molecular weight. Suitable viscosities of polydiorganosiloxanes (A) are about 10,000 to about 100,000 centipoise (cPs), with viscosities of about 20,000 to about 50,000 cPs being preferred, and viscosities of about 35,000 to about 45,000 cPs being more preferred.

Component (B) of the composition is a silanol-terminated polydiorganosiloxane having formula (II)

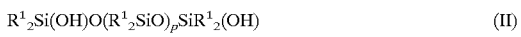

$$R^1{}_2Si(OH)O(R^1{}_2SiO)_pSiR^1{}_2(OH) \quad (II)$$

wherein each $R^1$ is independently an alkyl group having from 1 to about 10 carbon atoms or an aryl group, p is a number ranging from about 1,500 to about 10,000, preferably from about 2,000 to about 8,000, more preferably from about 5,000 to about 8,000. The average value of p is chosen to provide a viscosity of about 100,000 cPs to about 750,000 cPs, preferably about 160,000 cPs to about 450,000 cPs, more preferably about 250,000 cPs to about 450,000 cPs.

In formula (II), $R^1$ may be an alkyl group such as methyl, ethyl, and propyl, or an aryl group such as phenyl. Preferably, at least 99.5 percent and most preferably 100 percent of all $R^1$ radicals are alkyl and most preferably methyl.

Silanol-terminated polydiorganosiloxanes (B) can be present in an amount of about 2 to about 80 parts by weight, preferably about 4 to about 20 parts by weight; more preferably about 5 to about 15 parts by weight, based on the weight of the entire composition.

Silanol-terminated polydiorganosiloxanes (B) can be prepared according to the methods described in U.S. Pat. No. 4,016,328 to Horning.

Component (C) of the composition is a resinous organopolysiloxane copolymer that imparts tack to the cured pressure sensitive adhesive prepared from the composition. The resinous copolymer (C) comprises $R_3SiO_{1/2}$ units and $SiO_{4/2}$ units, where R is a hydrocarbon monovalent radical having from 1 to about 6 carbon atoms. Preferably, at least 95% of all R groups are alkyl groups. Methyl groups are highly preferred. The percentage of R radicals having olefinic unsaturation is preferably not greater than about 0.5%, more preferably not greater than about 0.1%, yet more preferably essentially zero. The resinous copolymer (C) comprises about 0.2% to about 5.0% and preferably from about 1.0% to about 3.0%, by weight based on the total weight of the copolymer, of hydroxyl radicals.

The resinous copolymer (C) preferably has a molar ratio of $R_3SiO_{1/2}$ units to $SiO_{4/2}$ units of about 0.5 to about 1.0; preferably about 0.6 to about 1.0; more preferably from about 0.7 to about 0.9.

Component (C) is present in an amount of about 20 to about 80 parts by weight, preferably about 30 to about 50 parts by weight, and more preferably about 35 to about 45 parts by weight, based on the weight of the entire composition.

Methods for making the resinous copolymer (C) are known in the art. Reference is made, for example, to U.S. Pat. No. 2,676,182 to Daudt et al., which is hereby incorporated by reference herein. In the Daudt et al. method, a silica hydrosol is reacted under acidic conditions with a source of triorganosiloxy units such as a hexaorganodisiloxane, e.g., hexamethyldisiloxane, or a hydrolyzable triorganosilane, e.g., trimethylchlorosilane, or mixtures thereof, to yield a benzene soluble resin copolymer having M and Q units.

Component (D) of the composition is an organohydrogenpolysiloxane compatible with the mixture of (A), (B) and (C) and having formula (III)

$$R^3_2HSiO(R^3_2SiO)_qSiHR^3_2 \qquad (III)$$

wherein each $R^3$ is independently an alkyl group having from 1 to about 10 carbon atoms or an aryl group; q has an average value of 1 to about 300; the molar ratio of silicon-bonded hydrogen groups in (D) to silicon-bonded alkenyl groups in (A) being in the range of from about 0.8:1 to about 1.5:1.

The term "compatible" means that the required amount of organohydrogenpolysiloxane (D) is at least partially soluble in the mixture of (A), (B), and (C) and will exist in a uniformly dispersed state in the composition while participating in the curing reaction, until the cure has been effected.

Examples of alkyl groups represented by $R^3$ in formula (III) above include methyl, ethyl, and propyl. An example of an aryl group represented by $R^3$ is phenyl. Preferably, at least 99.5 percent and most preferably 100 percent of all $R^3$ radicals are alkyl and most preferably methyl.

The total amount of alkenyl-terminated polydiorganosiloxane (A) and organohydrogenpolysiloxane (D) is preferably about 10 to about 50 parts by weight, more preferably about 20 to about 40 parts by weight, yet more preferably about 25 to about 35 parts by weight, based on the weight of the entire composition. Alternatively, the total amount of alkenyl-terminated polydiorganosiloxane (A) and organohydrogenpolysiloxane (D) may be stated as a weight ratio relative to resinous copolymer (C). A suitable weight ratio of resinous copolymer (C) to the sum of polydiorganosiloxane (A) and organohydrogenpolysiloxane (D) is about 1.1 to about 1.7, preferably about 1.2 to about 1.6, more preferably about 1.3 to about 1.5.

The molar ratio of silicon-bonded hydrogen groups in (D) to silicon-bonded alkenyl groups in (A) is about 0.8:1 to about 1.5:1; preferably about 0.9:1 to about 1.3:1, and more preferably about 1:1.

It is important that the molar ratio of silicon-bonded hydrogen groups (i.e., sometimes referred to herein as "SiH") in (D) to silicon-bonded alkenyl groups (i.e., sometimes referred to herein as "SiVi" or "SiVinyl") in (A) be in the ranges recited above. Maintaining an SiH:SiVi ratio within these limits ensures that a high molecular weight silicone network is formed during cure and ensures maximum tack values and thermal stability of the cured pressure sensitive adhesive by eliminating residual SiH groups that can react with MQ resin, which cause the physical properties to change over time.

The amount of organohydrogenpolysiloxane (D) sufficient to fulfill these ratio requirements is determined by measuring the alkenyl or vinyl contents of the desired types and amounts of components (A) and (C), which is typically evaluated by $^{29}$Si NMR. A precise amount of (D) can be used to provide a specific ratio of SiH to SiVinyl.

The organohydrogenpolysiloxane (D) must be terminated with hydride groups so that polymer chain extension with the terminal vinyl groups on (A) will occur during cure.

Organohydrogenpolysiloxanes and their preparation are well known in the organosilicon polymer art; some are commercially available. Briefly, the preparation of organohydrogensiloxanes can be accomplished in any suitable manner such as by hydrolyzing silanes, such as chlorosilanes, and equilibrating the resulting hydrolyzate under acid catalysis. Alternately, a mixture of suitable siloxanes, such as cyclic siloxanes and linear siloxanes, can be copolymerized and equilibrated under acid catalysis. For example, a hydride-stopped silicone fluid can be prepared by reacting tetramethyldisiloxane with cyclic methyl tetramer of predetermined ratio in the presence of Filtrol-20 as catalyst for 4–6 hours at 80–100° C. The Filtrol-20 catalyst is then removed by filtration and the residual reactants are removed by vacuum stripping.

Component (E) of the composition is a catalyst that promotes the hydrosilation reaction. Useful catalysts for facilitating the hydrosilation curing reaction include precious metal catalysts such as those comprising ruthenium, rhodium, palladium, osmium, iridium, platinum, or complexes of the foregoing metals.

Preferably, the hydrosilation catalyst is a platinum-containing catalyst. Suitable platinum-containing hydrosilation catalysts include any of the well known forms of platinum that are effective for catalyzing the reaction of silicon-bonded hydrogen atoms with silicon-bonded vinyl groups, such as finely divided metallic platinum, platinum on a finely divided carrier such as alumina, compounds of platinum such as chloroplatinic acid, and complexes of platinum.

Other suitable platinum-containing hydrosilation catalysts include the platinum hydrocarbon complexes described in U.S. Pat. Nos. 3,159,601 and 3,159,662 to Ashby, and the platinum alcoholate catalysts described in U.S. Pat. No. 3,220,970 to Lamoreaux, as well as the platinum catalysts of U.S. Pat. No. 3,814,730 to Karstedt. Additionally, the platinum chloride-olefin complexes described in U.S. Pat. No. 3,516,946 to Modic are also useful herein. All of the aforesaid catalysts are thermally activated. Also useful are the photoactive platinum catalysts such as those of U.S. Pat. No. 4,510,094 to Drahnak.

Catalysts soluble in the mixture of (A), (B), (C) and (D) are preferred, particularly if optical clarity is desired.

When the hydrosilation catalyst (E) is a platinum-containing catalyst, it is present in an amount sufficient to provide at least 0.1 part by weight platinum for one million parts by weight of the combined weight of (A), (B), (C) and (D). Frequently, such small amounts of catalyst are poisoned by trace amounts of impurities in the composition so it is advantageous to use the platinum catalyst in such quantities to provide at least 1.0 part per million (ppm). The amount of platinum-containing catalyst is not critical with respect to the upper limit but its cost would suggest that excessive quantities be avoided. Amounts of up to 200 ppm platinum are not unusual but preferably from 1 to 100 parts by weight of platinum for every one million parts by weight of the total of (A), (B), (C) and (D) are used.

Component (F) of the composition is a cross-linking agent selected from organic peroxides and azo compounds.

Organic peroxide crosslinking agents include benzoyl peroxide, dicumyl peroxide, 2,5-dimethyl-2,5-di(t-butylperoxy)hexane and dichlorobenzoyl peroxide. Benzoyl peroxide has been found to be a particularly effective organic peroxide crosslinking agent.

Examples of azo compound cross-linking agents include azobenzene, azobenzene-p-sulfonic acid, azobisdimethylvaleronitrile, azobisisobutyronitrile, or azodine, with azobisisobutyronitrile being preferred.

The crosslinking agent (F) is used at about 0.2 to about 6 weight percent, preferably about 1 to about 4 weight percent, more preferably about 2 to about 3 weight percent, based on the weight of the entire composition.

Cross-linking agent (F) can be added in pure form or as a solution, for example, in an appropriate solvent such as benzene, toluene, xylene, naphtha, chlorocarbons, or mineral spirits.

The compositions can further comprise up to about 30 parts by weight of an organic solvent (G). It is preferred that the amount of solvent be limited to less than about 20 percent by weight, more preferably less than about 10 percent by weight. It is expressly contemplated to reduce the composition's total solvent content by employing resinous copolymer (C) in spray-dried form. Currently preferred compositions still require at least about 3 weight percent solvent accompanying the addition of the cross-linking agent (F) in order to assure uniform distribution of the cross-linking agent in the total composition. Suitable organic solvents include any of the solvents conventionally used with organosiloxanes and having a boiling point below about 250° C., such as aromatic hydrocarbons, e.g., benzene, toluene, and xylene; aliphatic hydrocarbons such as hexane, heptane, and cyclohexane; halogenated hydrocarbon solvents such as trichloroethane and chloroform; naphthas such as petroleum ether, VM and P Naphtha and refined naphthas such as Naphthalite 66/3 and oxygenated solvents such as hydrocarbon ethers, e.g., tetrahydrofuran and the dimethyl-ether of ethylene glycol; ketones such as methyl isobutyl ketone; esters such as ethyl acetate; and the like. Mixtures of organic solvents can also be used.

When the hydrosilation catalyst (E) is a platinum catalyst, the composition may optionally comprise a platinum catalyst inhibitor (H), which increases the shelf life of the composition. Useful platinum catalyst inhibitors (H) displaying varying lengths of cure time inhibition include those described in, for example, U.S. Pat. Nos. 3,188,299; 3,188,300; 3,192,181; 3,344,111; 3,383,356; 3,445,420; 3,453,233; 3,453,234; and 3,532,649, and others which might be known in the art. Concrete examples of inhibitors include the eneynes, such as 3-methyl-3-pentene-1-yne and 3,5-dimethyl-3-hexene-1-yne; the alkynyl alcohols, such as 3-methyl-1-butyne-3-ol, 3,5-dimethyl-1-hexyne-3-ol, 3-methyl-1-pentyne-3-ol and phenylbutynol; the unsaturated esters, such as alkyl and substituted alkyl maleates; and polymethylvinylcyclosiloxanes. Highly preferred platinum catalyst inhibitors include 3-methyl-1-butyne-3-ol, methyl maleate, and butyl maleate.

The effectiveness of a platinum catalyst inhibitor depends on many factors such as its chemical composition, its physical properties, its concentration, and the like. An effective amount of any particular platinum catalyst inhibitor can be determined by routine experimentation. Typical platinum catalyst inhibitor levels are about 0.005% to 1.0% by weight, based on the weight of the entire composition. When the inhibitor is 3-methyl-1-butyne-3-ol, preferred levels are about 0.01 parts by weight to about 0.2 parts by weight based on the weight of the entire composition. Since many platinum catalyst inhibitors are relatively volatile it is preferable to add them to the composition after any heating or vacuum operations of the preparative process have been completed. For maximum effectiveness, however, a platinum catalyst inhibitor should be added to the composition at least simultaneously with, and preferably prior to the mixing of organohydrogenpolysiloxane (D) and hydrosilation catalyst (E), or parts containing them.

Small amounts of additional ingredients may be added to the composition, if desired. For example, antioxidants, pigments, stabilizers, fillers, and the like, may be added as long as they do not materially reduce the pressure sensitive adhesive properties of these compositions. Volatile additives are preferably added after any solvent removal operations have been completed.

It is preferred that the viscosity of the total composition is less than about 500,000 centipoise, preferably less than about 100,000 centipoise, more preferably less than about 50,000 centipoise. Low viscosities are necessary to ensure that the composition is pourable.

The components of the composition can be mixed in any manner such as in bulk or in organic solvent. Since the resinous copolymer (C) is a solid and is conveniently prepared and handled in an organic solvent, the preparation of the composition preferably uses an organic solvent, at least for the mixing of (A), (B), (C) and (D). The organic solvent can be any of the solvents recited above in connection with component (G). The mixing of the components can be accomplished by any of the techniques known in the art, such as milling, blending, stirring, and the like, either in batch or in continuous process.

The composition can be prepared, with or without the aid of solvent (G), by simply mixing components (A)–(F) together in the stated proportions. The order of mixing of the components is not critical, except that the organohydrogenpolysiloxane (D) and the hydrosilation catalyst (E) are preferably brought together last.

In a preferred embodiment, alkenyl-terminated polydiorganosiloxane (A) and silanol-terminated polydiorganosiloxane (B) are combined with a solution of resinous copolymer (C) in organic solvent (G), and the resulting mixture is heated in the presence of about 10 to about 30 parts per million of an alkaline catalyst, such as sodium hydroxide, to effect a silanol condensation reaction. After neutralizing the reaction product with an acid, such as phosphoric acid, organohydrogenpolysiloxane (D) and platinum catalyst inhibitor (H) are added and the intermediate composition is thoroughly mixed. The resulting mixture may be used immediately or stored. Prior to coating the pressure sensitive adhesive on a substrate, platinum hydrosilation catalyst (E) and organic peroxide (F) are added and thoroughly mixed with the above mixture of components (A)–(D), (G) and (H). The resulting composition is then coated on a desired substrate.

In another preferred embodiment, alkenyl-terminated polydiorganosiloxane (A), silanol-terminated polydiorganosiloxane (B), a solution of resinous copolymer (C) in organic solvent (G), organohydrogenpolysiloxane (D) and platinum catalyst inhibitor (H) are combined and thoroughly mixed. The resulting mixture may be used immediately or stored. Prior to coating the pressure sensitive adhesive on a substrate, platinum hydrosilation catalyst (E) and organic peroxide (F) are added and thoroughly mixed with the above mixture of components (A)–(D), (G) and (H). The resulting composition is then coated on a desired substrate.

To obtain compositions having at least 90% and preferably 100% solids, the blends of components (A)–(C) may be devolatilized under reduced pressure as described in U.S. Pat. No. 5,576,110 to Lin et al.

Curing of the composition can be accomplished by heating at temperatures of up to about 300° C., preferably at about 80° C. to about 200° C., for a suitable length of time which may be about one minute to about twelve hours. The compositions may also be cured by ultraviolet light or electron beam radiation. Ultraviolet light may be used to cure the compositions if one or more crosslinking agents is added prior to curing. Suitable sources of UV radiation include a Hanovia 550-watt lamp or a PPG Processor Model QC1202, inter alia.

The composition is useful as a pressure sensitive adhesive and will readily stick to a solid support, whether flexible or rigid. The composition is simply applied to the surface of the support by any suitable coating means, including rolling, spreading, spraying, and the like, and cured as described above. It should be understood that the use of the composition encompasses not only the application of the completed, uncured composition on the surface. For example, it is within the scope of this invention to apply a layer of a mixture comprising (A)–(D) to a solid support and then add the hydrosilation catalyst (E) and the organic peroxide (F), the needed mixing being accomplished by diffusion of (E) and (F) into the layer of (A)–(D). It is preferred to delay the curing reaction until (E) and (F) are thoroughly diffused into the layer on the support. Any solvent that is present in the cured composition is preferably allowed to evaporate before the surface bearing the composition is adhered to a substrate, although this is not necessary.

The surface of the support and the substrate to which the support is adhered may be any known solid material, including metals such as aluminum, silver, copper, iron, and their alloys; porous materials such as paper, wood, leather, and fabrics; organic polymeric materials such as polyolefins, e.g., polyethylene and polypropylene; fluorocarbon polymers such as polytetrafluoroethylene and polyvinylfluoride; silicone elastomers; silicone resins; polystyrene; polyamides, such as Nylon® polyamides; polyimides; polyesters; acrylic polymers; painted surfaces; siliceous materials such as concrete, bricks, and cinderblocks; and glass, e.g., glass cloth and the like. Porous materials such as glass cloth are often impregnated with a substance that will prevent the migration of the pressure sensitive adhesive from one surface to another surface of the support. It is also well known to chemically treat the surface of a fluorocarbon polymer support to enhance the adhesion of a pressure sensitive adhesive to the surface.

Solid supports bearing the cured composition are reliably adhered to any solid substrate because the composition possesses the desirable combination of high tack and good adhesive strength.

Useful articles that can be prepared with the pressure sensitive adhesives of this invention include pressure sensitive adhesive tapes, labels, emblems, and other decorative or informative signs, and the like. An especially useful article is one comprising a support, flexible or rigid, that can withstand extreme temperatures, hot and/or cold, and carrying on at least one surface thereof, the polyorganosiloxane pressure sensitive adhesives of this invention. Such an article makes full use of the stability at high temperatures and the flexibility at low temperatures that the pressure sensitive adhesives possess.

A preferred article is a pressure sensitive adhesive tape comprising an impregnated glass cloth, a polyester polymer, a polyimide polymer, or a chemically treated fluorocarbon polymer support carrying on at least one surface thereof the cured composition.

The invention is further illustrated by the following non-limiting examples.

EXAMPLE 1

A pressure sensitive adhesive was prepared by blending 24.3 parts by weight vinyl-terminated polydimethylsiloxane polymer (vinyl content 0.1% viscosity 35,000 centipoise), 5.6 parts by weight linear silanol (viscosity 250,000 centipoise), and 65.3 parts MQ resin solution (39.2 parts by weight MQ resin plus 26.1 parts by weight toluene; resin molecular weight 3,500 grams/mole). The MQ resin solution was prepared by dissolving MQ resin in toluene to make a 60% solids solution. The resin/gum ratio was 1.4. The mixture was heated to 105° C. for two hours in the presence of sodium hydroxide catalyst to complete the silanol condensation reaction between the resin and the gum. The system was cooled to room temperature and neutralized with phosphoric acid. To this mixture was added 4.7 parts by weight silicone hydride having 2 SiH groups per molecule and 0.093 parts by weight 3-methyl-1-butyne-3-ol as an inhibitor. Prior to application onto a substrate for curing, to 100 parts by weight of the above mixture was added 2 parts by weight benzoylperoxide and 100 ppm of chloroplatinic acid-vinylsiloxane complex. The adhesive composition was coated onto 25.4 micron KAPTON® polyimide sheets and cured by heating at 180° C. for 2 minutes to provide cured films having an adhesive thickness of 50.8 microns. Adhesion was measured by cutting the sheets into one inch wide tapes, rolling the tape onto a stainless steel panel with a five pound roller, allowing a 20 minute dwell time followed by pulling the tape from the panel at a 180 degree angle at a rate of 12 inches per minute. The average force required to peel the film from the panel was 32±1 ounces/inch. Tack was determined using a Polykin probe tack tester. The apparatus has a 0.5 cm diameter stainless steel probe. Three test procedures were applied: (i) using a load of 100 g/cm$^2$, a dwell time of 1 second and a pull speed of 1 cm/s; (ii) as in (i) but with a load of 1000 g/cm$^2$; (iii) lap shear test. The following data were obtained: tack (with 1000 g/cm$^2$ load)= 624±25 gram/centimeter$^2$ (g/cm$^2$); tack (with 100 g/cm$^2$ load)=578±26 g/cm$^2$. The lap shear strength of the cured adhesive was measured by attaching the adhesive to a clean stainless steel plate, with a 1 inch by 1 inch overlap; a 500 gram deadweight was attached to the end of the adhesive tape such that it established a pressure of about 1.1 pounds per square inch of steel on the adhesive. The device was then maintained at 500° F. (260° C.) for up to 24 hours and the time of failure was noted; a value of >24 hours indicates that the sample did not fail within the duration of the test. These results are listed in the Table.

EXAMPLE 2

Twenty-two parts by weight vinyl-terminated polydimethylsiloxane polymer having viscosity of 35,000 centipoise (vinyl content 0.07%), 8 parts silanol (viscosity 250,000 centipoise), 65 parts by weight MQ resin solution (39 parts by weight MQ resin plus 26 parts by weight toluene; resin molecular weight 3,500), 5 parts by weight silicone hydride having 2 SiH groups per molecule and 0.1 parts by weight 3-methyl-1-butyne-3-ol were mixed. The MQ resin solution was prepared by dissolving the resin in toluene to make a 60% solids solution. Prior to application onto a substrate for curing, to 100 parts by weight of the above mixture was added 2 parts by weight benzoylperoxide and 100 ppm of chloroplatinic acid-vinylsiloxane complex. This composition was evaluated by the same methods as in Example 1, and the results are summarized in the Table.

Comparative Examples 3, 4 and 5

Comparative Example 3 was prepared by mixing 24 parts by weight polydimethylsiloxane polymer having viscosity of 670,000 centipoise, 51 parts by weight MQ resin solution (30.6 parts by weight MQ resin plus 20.4 parts by weight xylene; resin molecular weight 3,500), 24.5 parts of xylene to form a homogeneous solution. After the addition of 0.014 parts of 10% sodium hydroxide, the solution was refluxed for three hours. The composition was cooled below 50° C. then neutralized with 0.055 parts of 10% phosphoric acid in isopropanol; 0.05 parts cerium octoate was added. The composition was adjusted to 55% solids with xylene. Prior to application onto a substrate for curing, to 100 parts by weight of the above mixture was added 1.1 parts by weight benzoyl peroxide. Comparative Example 4 was prepared by mixing 25.9 parts by weight polydimethylsiloxane polymer having viscosity of 640,000 centipoise, 56.8 parts by weight MQ resin solution (34.1 parts by weight MQ resin plus 22.7 parts by weight toluene; resin molecular weight 3,500), and 24.5 parts of toluene give a homogeneous solution. After addition of 0.035 parts of 10% sodium hydroxide, the solution was refluxed for three hours. The composition was cooled below 50° C. then neutralized with 0.014 parts of 10% phosphoric acid solution in isopropanol; 0.05 parts cerium octoate was added. The composition was adjusted to 55% solids with toluene. Prior to application onto a substrate for curing, to 100 parts by weight of the above mixture was added 1.1 parts by weight benzoyl peroxide. These compositions were evaluated by the same methods as in Example 1, and the results are summarized in the Table. The Table also includes data, similarly obtained, for Comparative Example 5, which is take from U.S. Pat. No. 5,576,110 and corresponds to Example 17 in that reference.

TABLE

|  | Example 1 | Example 2 | Comp. Example 3 | Comp. Example 4 | Comp. Example 5 |
|---|---|---|---|---|---|
| % solids | 74.4% | 81.7% | 55% | 55% | 85.7% |
| peel adhesion (ounces/inch) | 32 ± 1 | 28 ± 1 | 27 | 28 | 28 |
| tack with 100 g/cm² load (g/cm²) | 578 ± 26 | 520 ± 28 | 530 | 512 | — |
| tack with 1000 g/cm² load (g/cm²) | 624 ± 25 | 577 ± 27 | 790 | 658 | 580 |
| lapshear, 500 gram load (hours at 500° F.) | >24 | >24 | >24 | >24 | >24 |

These results show that Examples 1 and 2, of the invention, exhibit comparable or superior peel adhesion, and comparable or superior tack with 100 gram load versus Comparative Examples 3–5. The invention is thus capable of providing an excellent balance of adhesion and tack at low solvent levels.

All cited patents and other references are incorporated herein by reference.

What is claimed is:
1. A curable silicone coating composition, comprising:
(A) about 20 to about 80 parts by weight of an alkenyl-terminated polydiorganosiloxane of formula (I)

$$R^2R^1{}_2SiO(R^1{}_2SiO)_mSiR^1{}_2R^2 \quad (I)$$

wherein each $R^1$ is independently an alkyl group having from 1 to about 10 carbon atoms or an aryl group, $R^2$ is an alkenyl group having from 1 to about 10 carbon atoms, and m has an average value of about 20 to about 2000;

(B) about 2 to about 80 parts by weight of a silanol-terminated polydiorganosiloxane of formula (II)

$$R^1{}_2Si(OH)O(R^1{}_2SiO)_pSiR^1{}_2(OH) \quad (II)$$

wherein each $R^1$ is independently an alkyl group as defined above, and the average value of p is chosen to provide a viscosity of about 100,000 centipoise to about 750,000 centipoise;

(C) about 20 to about 80 parts by weight of a resinous copolymer containing $R_3SiO_{1/2}$ units and $SiO_{4/2}$ units, where R is a hydrocarbon monovalent radical having from 1 to about 6 carbon atoms, said resinous copolymer having a molar ratio of $R_3SiO_{1/2}$ units to $SiO_{4/2}$ units of about 0.6 to about 0.9;

(D) an organohydrogenpolysiloxane of formula (III)

$$R^3{}_2HSiO(R^3{}_2SiO)_qSiHR^3{}_2 \quad (III)$$

wherein each $R^3$ is independently an alkyl group having 1 to about 10 carbon atoms or an aryl group; q has an average value of 1 to about 300; the molar ratio of silicon-bonded hydrogen groups in (D) to silicon-bonded alkenyl groups in (A) being about 0.8:1 to about 1.5:1;

(E) a catalytic amount of a hydrosilation catalyst; and
(F) about 0.2 to about 6 parts by weight of a cross-linking agent comprising an organic peroxide or an organic azo compound;

wherein all parts by weight are based on the weight of the entire composition.

2. The curable silicone coating composition of claim 1, wherein, in the alkenyl-terminated polydiorganosiloxane, m has an average value of about 90 to about 1200.

3. The curable silicone coating composition of claim 1, wherein, in the alkenyl-terminated polydiorganosiloxane, m has an average value of about 120 to about 1000.

4. The curable silicone coating composition of claim 1, wherein, in the alkenyl-terminated polydiorganosiloxane, at least 99.5 percent of all $R^1$ radicals are alkyl.

5. The curable silicone coating composition of claim 1, wherein, in the alkenyl-terminated polydiorganosiloxane, at least 99.5 percent of all $R^1$ radicals are methyl.

6. The curable silicone coating composition of claim 1, wherein, in the alkenyl-terminated polydiorganosiloxane, $R^2$ is vinyl.

7. The curable silicone coating composition of claim 1, wherein, in the silanol-terminated polydiorganosiloxane, at least 99.5 percent of all $R^1$ radicals are alkyl.

8. The curable silicone coating composition of claim 1, wherein, in the silanol-terminated polydiorganosiloxane, at least 99.5 percent of all $R^1$ radicals are methyl.

9. The curable silicone coating composition of claim 1, wherein, in the resinous copolymer, at least 95 percent of all R radicals are alkyl.

10. The curable silicone coating composition of claim 1, wherein, in the resinous copolymer, at least 95 percent of all R radicals are methyl.

11. The curable silicone coating composition of claim 1, wherein, in the resinous copolymer, the percentage of R radicals having olefinic unsaturation is not greater than about 0.5%.

12. The curable silicone coating composition of claim 1, wherein, in the resinous copolymer, the percentage of R radicals having olefinic unsaturation is not greater than about 0.1%.

13. The curable silicone coating composition of claim 1, wherein resinous copolymer (C) comprises about 0.2% to about 5.0% by weight of hydroxyl radicals based on the total weight of the copolymer.

14. The curable silicone coating composition of claim 1, wherein, in the organohydrogenpolysiloxane, at least 99.5 percent of all $R^3$ radicals are alkyl.

15. The curable silicone coating composition of claim 1, wherein, in the organohydrogenpolysiloxane, at least 99.5 percent of all $R^3$ radicals are methyl.

16. The curable silicone coating composition of claim 1, wherein the total amount of alkenyl-terminated polydiorganosiloxane and organohydrogenpolysiloxane is about 10 to about 50 parts by weight, based on the weight of the entire composition.

17. The curable silicone coating composition of claim 1, wherein the weight ratio of the resinous copolymer to the sum of the polydiorganosiloxane and the organohydrogenpolysiloxane is about 1.1 to about 1.7.

18. The curable silicone coating composition of claim 1, wherein the molar ratio of silicon-bonded hydrogen groups in (D) to silicon-bonded alkenyl groups in (A) is from about 0.8:1 to about 1.5:1.

19. The curable silicone coating composition of claim 1, wherein the hydrosilation catalyst is a platinum-containing catalyst.

20. The curable silicone coating composition of claim 19, additionally comprising a platinum catalyst inhibitor.

21. The curable silicone coating composition of claim 20, wherein the platinum catalyst inhibitor comprises at least one compound selected from the group consisting of 3-methyl-1-butyne-3-ol, methyl maleate and butyl maleate.

22. The curable silicone coating composition of claim 1, wherein the cross-linking agent comprises an organic peroxide.

23. The curable silicone coating composition of claim 1, wherein the cross-linking agent comprises benzoyl peroxide.

24. The curable silicone coating composition of claim 1, further comprising (G) up to about 30 parts by weight of an organic solvent having a boiling point not greater than about 250° C.

25. The curable silicone coating composition of claim 24, wherein the solvent is selected from the group consisting of aromatic hydrocarbons, benzene, toluene, xylene, aliphatic hydrocarbons, hexane, heptane, cyclohexane, halogenated hydrocarbons, trichloroethane, chloroform, naphthas, petroleum ether, VM Naptha, P Naphtha, refined naphthas, Naphthalite 66/3, hydrocarbon ethers, tetrahydrofuran, ethylene glycol dimethylether, ketones, methyl isobutyl ketone, esters, ethyl acetate, and mixtures comprising at least one of the foregoing solvents.

26. The curable silicone coating composition of claim 1, wherein the viscosity of the total composition is less than about 500,000 cPs.

27. The curable silicone coating composition of claim 1, wherein the viscosity of the total composition is less than about 100,000 cPs.

28. The curable silicone coating composition of claim 1, wherein the viscosity of the total composition is less than about 50,000 cPs.

29. The cured composition of claim 1.

30. A curable silicone coating composition, comprising:
(A) about 20 to about 40 parts by weight of an alkenyl-terminated polydiorganosiloxane of formula (I)

wherein $R^1$ is methyl, $R^2$ is vinyl, and m has an average value of about 120 to about 1000;

(B) about 5 to about 15 parts by weight of a silanol-terminated polydiorganosiloxane of formula (II)

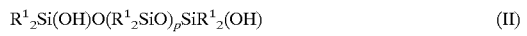

wherein $R^1$ is methyl, and the average value of p is chosen to provide a viscosity of about 250,000 centipoise to about 450,000 centipoise;

(C) about 35 to about 45 parts by weight of a resinous copolymer containing $R_3SiO_{1/2}$ units and $SiO_{4/2}$ units, where R is methyl, said resinous copolymer having a molar ratio of $R_3SiO_{1/2}$ units to $SiO_{4/2}$ units from about 0.6 to about 0.9;

(D) an organohydrogenpolysiloxane of formula (III)

wherein $R^3$ is methyl; q has an average value of 1 to about 300; the molar ratio of silicon-bonded hydrogen groups in (D) to silicon-bonded alkenyl groups in (A) being about 1:1;

(E) a catalytic amount of a hydrosilation catalyst comprising platinum;

(F) about 0.2 to about 6 parts by weight of a cross-linking agent comprising an benzoyl peroxide;

(G) optionally, not greater than about 10 percent by weight of an organic solvent having a boiling point not greater than about 250° C.; and (H) about 0.01 to about 0.2 parts by weight of a platinum catalyst inhibitor selected from the group consisting of 3-methyl-1-butyne-3-ol, methyl maleate, butyl maleate, and mixtures comprising at least one of the foregoing inhibitors;

wherein all parts by weight are based on the weight of the entire composition.

31. The cured composition of claim 30.

32. An article of manufacture comprising a solid support carrying on at least one surface therof the curable composition of claim 1.

33. An article of manufacture comprising a solid support carrying on at least one surface therof the cured composition of claim 1.

34. A pressure sensitive adhesive tape comprising a flexible support carrying on at least one surface thereof the curable composition of claim 1.

35. A pressure sensitive adhesive tape comprising a flexible support carrying on at least one surface thereof the cured composition of claim 1.

* * * * *